June 17, 1930.   H. A. HURLEY ET AL   1,764,103
APPARATUS FOR AUTOMATICALLY DETERMINING AND
RECORDING THE SPECIFIC GRAVITIES OF FLUIDS
Filed Aug. 1, 1927

Inventors:
Harry A. Hurley,
Herbert J. Jones,
Honordto Jimenez,

ATTORNEY

Patented June 17, 1930

1,764,103

UNITED STATES PATENT OFFICE

HARRY A. HURLEY, OF LOS ANGELES, HERBERT J. JONES, OF FULLERTON, AND HONORATO JIMENEZ, OF LOS ANGELES, CALIFORNIA

APPARATUS FOR AUTOMATICALLY DETERMINING AND RECORDING THE SPECIFIC GRAVITIES OF FLUIDS

Application filed August 1, 1927. Serial No. 209,971.

Our invention relates to apparatus for determining and recording the specific gravities of fluids, and it is a purpose of our invention to provide an apparatus of this character by which an ever recurring means is produced by comparing the speeds of flow of fluids in such manner that their specific gravities can be automatically and accurately determined and recorded.

It is also a purpose of our invention to provide an apparatus which is particularly adapted, although not necessarily, for use in the measurement of gases, natural and artificial, flowing through pipe lines where, due to the mixing of gases of different densities or for other reasons, it is desirable to have a record of the true specific gravity of the gas at all times.

We will describe only one form of apparatus for automatically determining and recording the specific gravity of fluids embodying our invention and will then point out the novel features thereof in claims.

In the accompanying drawings:

Fig. 1 shows the apparatus in inactive position and

Figure 1:
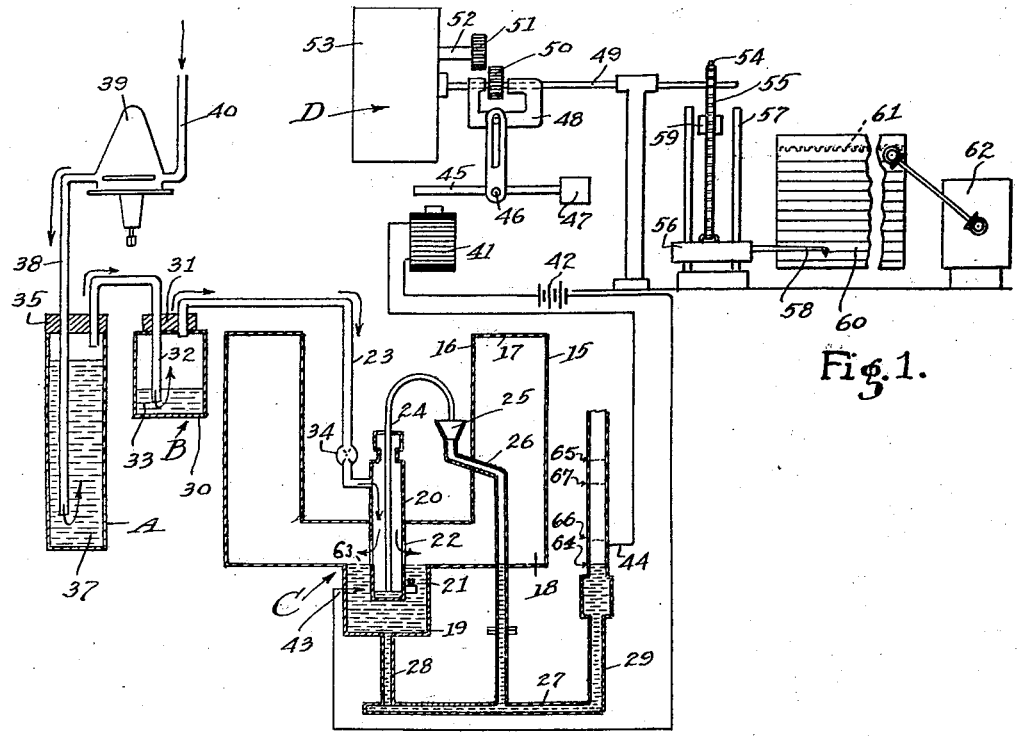
Fig. 1 is a view showing schematically one form of apparatus for automatically determining and recording the specific gravities of the fluids embodying our invention.

Our invention in its present embodiment consists in the main of four devices, namely: a fluid filter A, a mercury seal device B, a mercury pump C, and a graphic recording device D.

The mercury pump C comprises in the present instance a fluid tank made up of inner and outer cup-shaped members 15 and 16 connected at the upper ends by a partition 17 all in a manner to provide a fluid-tight chamber 18. The bottom of the member 15 is formed with a cup-shaped depressed portion 19 which constitutes a well for mercury. Extending through the bottom of the member 16 is a pipe 20, its lower end being disposed in the well 19 and provided with a jet or port 21 through which mercury from the well 19 is adapted to pass into the pipe. The upper and lower ends of the pipe are closed, but between its ends the pipe is formed with openings 22 through which the fluid to be tested can enter the chamber 19. The fluid in turn is supplied to the pipe 20 from a tube 23 connected to the pipe 20 at a point above the openings 22.

The upper end of the pipe 20 is constructed to receive and secure an ejector tube 24 axially therein, the lower end of the tube terminating in spaced relation to the bottom of the pipe 20 and just below the jet or port 21. The upper end of the tube 24 projects beyond the pipe 20 where it is curved, as shown, with its extreme end open and disposed directly above the funnel end 25 of a return tube 26 for the purpose of discharging the mercury ejected therefrom into the return tube. The tube 26 extends downwardly and is connected to a main tube 27 provided with an upwardly extending branch tube 28 which is connected to the bottom of the depressed portion 19 for communication with the mercury well. The main tube 27 is also provided with another branch tube 29 which extends upwardly to one side of the tank where it is provided with electrical contacts as will be described hereinafter.

The mercury seal device B is conventional in form and consists of a vessel 30 having a closure member 31 through which one arm of a U-shaped tube 32 extends into the vessel with its lower end terminating in spaced relation to the bottom of the vessel and submerged in a body of mercury 33. The pipe 23 is of such length and form to have a portion thereof extended through the closure 31 for communication with the interior of the vessel for the purpose of conducting fluid from the vessel to the pipe 20. The pipe 23 adjacent its point of connection with the pipe 20 is provided with a restricted orifice or port 34 such as that used in a specific gravity effusion bottle. The tube 32 has another arm which is extended through the closure member 35 of a vessel 36. This vessel contains a body of oil 37 and constitutes the fluid filter. The inner end of the tube 32 terminates at a point above the oil 37 while a tube 38 extends through the closure member into the oil, as shown. This tube 38 communicates with a conventional form of fluid pressure regulator 39 by which the pressure of fluid from a supply line 40 is reduced and regulated in its passage to the tube 38.

The graphic recording device D comprises in the present instance an electromagnet 41 having a circuit including a battery 42 and contacts 43 and 44. The contact 43 extends through the member 19 of the pump tank and is insulated therefrom, and it is adapted to be engaged by the mercury in the well 19 when the apparatus is in the inactive position shown in Fig. 1.

The contact 44 extends into and is insulated from the tube 29 and is disposed at a predetermined level as will be described hereinafter. The armature for the magnet 41 is in the form of a bell-crank lever 45, pivoted at the point indicated at 46 and provided with a counterweight 47 which urges the lever to the position shown in Fig. 1. The upper end of the lever 45 has a pin and slot connection with a carriage 48, slidable on a shaft 49 to cause a pinion 50 to be moved into or out of mesh with a pinion 51. The pinion 50 is keyed to the shaft 49 to rotate the latter but is capable of movement longitudinally thereon in order to engage or disengage the pinion 51.

The pinion 51 is fixed to the shaft 52 of a clockwork mechanism 53. This mechanism may be of any conventional form. The shaft 49 is provided with a sprocket wheel 54 about which is trained a chain 55 connected to the weight 56 movable on upright rods 57 and carrying a stylus 58. The opposite end of the chain is provided with a weight 59 which acts as a counterbalance for the weight 56 to aid in elevating the latter. The stylus 59 is movable over an endless sheet or web 60 of paper or any other suitable material, constituting a chart, and this web is fixed to an endless rack 61 trained about rollers to assume the form of a rectangle so that the chart will likewise assume a rectangular form. The rack in turn is constantly driven by a clockwork mechanism 62 through the connection shown.

The operation of the apparatus is as follows:

When the pump is inactive the movable parts of the apparatus are in the position shown in Fig. 1. The pump is provided with a sufficient quantity of mercury indicated at 63, to fill the well 19 and the tubes 26 and 29 to the level shown in Fig. 1. In this position the mercury is out of engagement with the contact 44 and consequently the circuit for the magnet 41 is disrupted. With the magnet deenergized the lever 45 is moved to the position shown in Fig. 1 under the action of the weight 47 so that the pinion 50 is out of mesh with the rotating pinion 51. The stylus 58 therefore assumes the lowered position shown in Fig. 1 under the action of the weight 56. With a fluid such as gas supplied to the regulator 39 from the pipe 40 the filling stroke of the pump is now initiated. The gas leaving the regulator 39 may be at a relatively low pressure, say four pounds, and from the regulator the gas passes through the tube 38 into the oil 37 of the vessel 36 where, in rising through the oil, the gas is filtered and discharged from the vessel through the pipe 32 into the mercury of the vessel 30.

Figure 2:
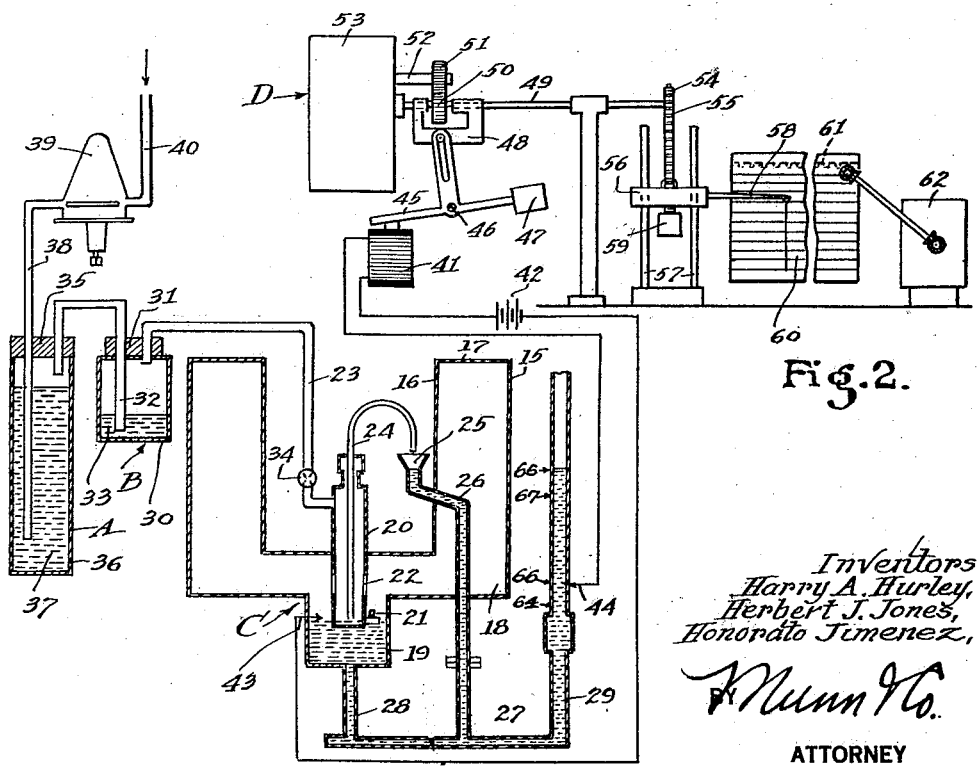
Fig. 2 is a view identical to Fig. 1 showing the apparatus in active position.

The gas now rises through the mercury and is discharged from the vessel 30 through the tube 23 where it enters the pipe 20 through the orifice 34. From the pipe 20 the gas passes into the chamber 18 through the ports 22 where the pressure of the gas slowly builds up acting on the mercury in the well 19 until the mercury in the well and the tubes 24, 26, and 29 assume the levels shown in Fig. 2. When this gas pressure is reached, as controlled by the length of the tube 24, the mercury level falls below the bottom of the tube and thus exposes the mercury therein to the gas pressure. A further slight increase of pressure overcomes the friction of the column of mercury in the tube 24, and this causes it to rise until it is finally ejected from the upper end of the tube into the tube 26.

With mercury ejected from the tube 24 the chamber 18 is now in communication with atmosphere and so remains until the mercury flows back into the well and to a level in which the jet 21 is submerged. Upon submergence of the jet mercury enters the pipe 20 and thus again seals the lower end of the tube 24. The jet restricts the flow of mercury into the pipe 20 even after it is submerged, and this period of time allows all of the gas in the chamber 18 to flow back into the pipe 20 through the ports 22 and thus escape to atmosphere through the tube 24. This reduces the pressure nearly to that of atmosphere.

The emptying stroke of the pump is completed when the mercury level in the pipe 20 rises to the level shown in Fig. 1, in which the lower end of the tube 24 is again sealed. Completion of the emptying stroke marks the beginning of the filling stroke, and in the operation of the apparatus this cycle is repeated so long as gas or any other fluid under pressure is supplied to the pump. By introducing a gas of constant specific gravity through the tube 38 and holding a constant pressure of the gas on the orifice 34 it is found that the time required for the filling stroke remains constant. However, by changing the specific gravity, still maintaining the same gas pressure, the time required for the filling stroke instantly changes accordingly. That is, a heavy gas takes longer to pass through the orifice 34 and build up the required pressure within the chamber 18 than does a light gas. This phenomena permits one to time the filling strokes for gases of different specific gravities and to give their specific gravities as a decimal value of the specific gravity of air which is unity. By means of our apparatus the filling stroke can be timed by measuring the time required in each cycle for the fluid pressure to build between the two selected mercury levels in the tube 29.

Considering Fig. 1, the mercury level corresponding to the start of the filling stroke is indicated at 64, and the end of the filling stroke at 65. To preclude all possibility of error resultant of fluctuation in the level of the mercury both at the beginning and end of the filling stroke, the total filling stroke is not timed but instead only a portion thereof as is represented between the lines or levels 66 and 67. The contact 44 is at the level 66, and the contact 43 is at such level within the well 19 that when the mercury in the tube 29 reaches the level 67 the mercury in the well has dropped below the contact 43. Thus, it will be clear that the graphic recording device operates as follows:

With the pump at the start of the filling stroke, as illustrated in Fig. 1, the contact 43 is within the mercury but the contact 44 is clear of the mercury and consequently the magnet 41 is deenergized. However, under the building up of gas pressure in the chamber 18, the mercury is caused to rise in the tube 29 more rapidly than the mercury is lowered in the well 19, therefore the mercury will move into engagement with the contact 44 before it disengages the contact 43, thereby completing the circuit for the magnet 41 and energizing the latter.

With the magnet 41 energized the recording device is set into operation, resulting in the elevation of the stylus 58 over the surface of the chart 60 and thus graphically recording on the chart the movement of the stylus. The stylus continues to rise until the magnet 41 is deenergized by lowering of the mercury level in the well 19 to uncover the contact 43 when the pinion 50 is moved out of mesh with the pinion 51 to discontinue rotation of the shaft 49. Thus the interval of time as defined by the closing and opening of the magnet circuit controls the degree of movement of the stylus; and as the duration of completion of the magnet circuit corresponds to the filling stroke of the pump or rather a portion thereof, it will be evident that the extent of operation of the recording device is in strict accordance with the filling stroke of the pump. Thus as the pump's filling stroke varies in duration of time as determined by the specific gravity of the gas operating the movement of the stylus on the chart will vary accordingly thereby inscribing upon the chart a graphic record which accurately determines the specific gravity of the gas delivered to the pump at that particular stroke. Where the specific gravity of the fluid being tested fluctuates, the recording device will, through the medium of the mercury pump be controlled accordingly to operate and thus graphically record on the chart such fluctuations.

Although we have herein shown and described only one form of apparatus embodying our invention, it is to be understood that various changes and modifications may be made herein without departing from the spirit of the invention and the spirit and scope of the appended claims.

We claim:

1. An apparatus for determining the specific gravity of fluids comprising a pump, and means for supplying a fluid under constant pressure to the pump so as to actuate the latter and in such manner that the duration of the pump's filling stroke varies in accordance with the specific gravity of the fluid.

2. An apparatus for determining the specific gravity of fluids comprising a mercury pump, and means for supplying a fluid under constant pressure to the pump so as to actuate the latter and in such manner that the duration of the pump's filling stroke varies in accordance with the specific gravity of the fluid.

3. An apparatus for determining the specific gravity of fluids comprising a pump, a fluid supply line communicating therewith and having a restricted orifice therein, and a pressure regulator for maintaining the pressure constant of the fluid supplied to the orifice whereby the speed at which the fluid pressure builds up in the pump varies with the specific gravity of the fluid entering the orifice, said pump operating when the fluid reaches a predetermined pressure to allow the fluid to escape from the pump and the fluid pressure to be lost.

4. An apparatus as embodied in claim 3 wherein the pump includes means by which it is resealed following exhaust of fluid therefrom to cause rebuilding of a succeeding quantity of fluid to the same predetermined pressure and the subsequent escape of the fluid therefrom whereby the operation of the pump is rendered continuous.

5. An apparatus as embodied in claim 3 wherein a sealing device is interposed between the orifice and regulator to prevent back flow in case the line pressure ceases.

6. In an apparatus of the character described, a pump, a fluid supply line communicating therewith and having a restricted orifice therein, and a pressure regulator for maintaining the pressure constant of the fluid supplied to the orifice whereby the speed at which the fluid pressure builds up in the pump varies with the specific gravity of the fluid entering the orifice, said pump operating when the fluid reaches a predetermined pressure to allow the fluid to escape from the pump and the fluid pressure to be lost.

7. In an apparatus of the character described, a tank having a chamber, means for supplying a fluid to the chamber under a constant pressure, and liquid means normally sealing the chamber but operable when the fluid in the chamber reaches a predetermined pressure to unseal the chamber and thus permit the fluid to escape following which the liquid again seals the chamber to allow a rebuilding of fluid pressure therein.

8. An apparatus of the character described comprising a liquid pump having a tank adapted to contain a body of liquid with a sealed chamber above the liquid, a supply pipe for a fluid to be tested communicating with the chamber and having a restricted orifice, means for regulating the pressure of the fluid supply to the restricted orifice so that it is maintained constant, a discharge tube having its lower end projecting into the chamber and its upper end in communication with atmosphere, and a liquid conveying pipe having its lower end communicating with the bottom of the tank and its upper end in communication with atmosphere, the lower end of the discharge tube being normally submerged in the body of liquid and thus sealed by the latter whereby, when the pressure of fluid in the chamber reaches a degree in which the liquid is lowered to expose the lower end of the discharge tube, the fluid in the chamber will be exhausted to atmosphere, relieving the liquid of pressure and permitting it to rise to its normal level.

9. An apparatus of the character described comprising a liquid pump having a tank adapted to contain a body of liquid with a sealed chamber above the liquid, a supply pipe for a fluid to be tested communicating with the chamber and having a restricted orifice, means for regulating the pressure of the fluid supply to the restricted orifice so that it is maintained constant, a discharge tube having its lower end projecting into the chamber and its upper end in communication with atmosphere, a liquid conveying pipe of U-form having one arm communicating with the bottom of the tank and the other arm in communication with atmosphere, the lower end of the discharge tube being normally submerged in the body of liquid and thus sealed by the latter whereby, when the pressure of fluid in the chamber reaches a degree in which the liquid is lowered to expose the lower end of the discharge tube, the fluid in the chamber will be exhausted to atmosphere, relieving the liquid of pressure and permitting it to rise to its normal level, and a pair of electrical contacts extending into the arms of the liquid conveying pipe at different levels to include the liquid in a circuit when the two contacts are simultaneously engaged by the liquid to control an electrical circuit for the purpose described.

HERBERT J. JONES.
HARRY A. HURLEY.
HONORATO JIMENEZ.